US008352572B2

(12) United States Patent
Gourraud

(10) Patent No.: US 8,352,572 B2
(45) Date of Patent: *Jan. 8, 2013

(54) METHOD AND SYSTEM FOR PROVIDING MEDIA CONTENT TO A USER

(75) Inventor: Christophe Gourraud, Fribourg (CH)

(73) Assignee: Swisscom (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,319

(22) Filed: Mar. 30, 2012

(65) Prior Publication Data

US 2012/0190329 A1 Jul. 26, 2012

Related U.S. Application Data

(63) Continuation of application No. 11/510,834, filed on Aug. 28, 2006, now Pat. No. 8,166,129.

(30) Foreign Application Priority Data

Sep. 2, 2005 (EP) .................... 05405515

(51) Int. Cl.
*G06F 15/16* (2006.01)
*H04L 12/28* (2006.01)
*H04L 12/16* (2006.01)

(52) U.S. Cl. ........ 709/217; 709/218; 709/219; 370/254; 370/259

(58) Field of Classification Search .......... 709/217–219; 370/254, 259
See application file for complete search history.

(56) References Cited

U.S. PATENT DOCUMENTS

| 6,189,030 | B1 | 2/2001 | Kirsch et al. |
| 6,415,323 | B1 | 7/2002 | McCanne et al. |
| 7,299,290 | B2 | 11/2007 | Karpoff |
| 7,502,837 | B2 * | 3/2009 | Westman et al. ............. 709/219 |
| 7,844,682 | B2 * | 11/2010 | Nguyen ....................... 709/213 |
| 2003/0236896 | A1 | 12/2003 | Isomaki et al. |
| 2004/0107143 | A1 * | 6/2004 | Niemi ............................. 705/26 |
| 2004/0184432 | A1 * | 9/2004 | Gateva et al. ................ 370/349 |
| 2005/0111441 | A1 * | 5/2005 | Koskelainen ................. 370/352 |

(Continued)

OTHER PUBLICATIONS

"Universal Mobile Telecommunications System (UMTS); End-to-End transparent streaming services; General description" (3GPP TS 26.233 version 6.0.0 Release 6), ETSI TS 126 233 V6.0.0, Technical Specification, XP014027757, Sep. 2004, pp. 1-15 and cover page.

(Continued)

*Primary Examiner* — Shirley Zhang
(74) *Attorney, Agent, or Firm* — McAndrews, Held & Malloy, Ltd.

(57) ABSTRACT

A Call Session Control Function (CSCF) unit may receive from a user a Session Initiation Protocol (SIP) message, which may be transmitted via a communication terminal, identifying particular media content on a particular content server, and in response the CSCF unit may transmit a second message to a particular application server (SIP-AS) if the CSCF unit determines that the SIP message is associated with the application server. The application server may generate and transmit to the communication terminal accessing information that may be used by the user to retrieve, via the communication terminal, the media content from the content server. Submitting content requests in this manner may enable routing content requests through an IP Multimedia Subsystem (IMS), thereby making use of filtering features of the IMS for user authentication and access control, and obviating need for separate proprietary access control mechanisms for the content server.

18 Claims, 2 Drawing Sheets

U.S. PATENT DOCUMENTS

| | | | |
|---|---|---|---|
| 2005/0226174 A1* | 10/2005 | Kiss | 370/282 |
| 2006/0034195 A1 | 2/2006 | Blaiotta et al. | |
| 2006/0270404 A1* | 11/2006 | Tuohino et al. | 455/432.3 |
| 2007/0100981 A1* | 5/2007 | Adamczyk et al. | 709/223 |
| 2008/0212569 A1 | 9/2008 | Terrill et al. | |
| 2008/0215736 A1 | 9/2008 | Astrom et al. | |

OTHER PUBLICATIONS

"Digital cellular telecommunications system (Phase 2+); Universal Mobile Telecommunications System (UMTS); IP Multimedia (IM) session handling; IM call model; Stage 2", (3GPP TS 23.218 version 6.3.0 Release 6), ETSI TS 123 218 V6.3.0, Technical Specification, XP 014027527, Mar. 2005, pp. 1-58 and cover page.

Burger, "A Mechanism for Content Indirection in Session Initiation Protocol (SIP) messages", Oct. 2004.

European Search Report dated Mar. 2, 2006 re: Application No. 0540555.7-2413.

* cited by examiner

METHOD AND SYSTEM FOR PROVIDING MEDIA CONTENT TO A USER

CLAIM OF PRIORITY

This application is a continuation of U.S. patent application Ser. No. 11/510,834, which was filed on Aug. 28, 2006 now U.S. Pat. No. 8,166,129, and which claims priority from European (EP) Patent Application No. 05405515.7 filed on Sep. 2, 2005.

FIELD OF THE INVENTION

The present invention relates to a method and a system for providing media content to a user. Specifically, the present invention relates to a method and a system for providing to a user on a communication terminal media content from a content server. Particularly, the present invention relates to a method and a system for providing the media content to the user on a mobile communication terminal.

BACKGROUND OF THE INVENTION

Conventionally, media content is made available in the World Wide Web on servers. Users equipped with communication terminals can access the media content through telecommunications networks having access to the Internet. The media content is made available as digital data representing picture, video, audio and/or text content. Typically, users use their communication terminals as client devices to browse the World Wide Web or Internet, respectively, and access media content through hyperlinks referencing the media content. Hyperlinks include or are associated with a uniform resource locator (URL) of the respective media content. Hyperlinks to media content are often provided on web pages of so called portal servers. A hyperlink displayed on the communication terminal and activated (e.g. clicked) by the user causes the respective media content to be transmitted from the (content) server, where the media content is stored, to the communication terminal. Portal servers and content servers can be implemented on a common computer; typically, they are implemented on separate computers, however. To control access to the media content, the portal servers are often provided with access control modules requesting a user to provide login information such as user name, password and/or a credit card number. The access control modules rely on users to register prior to logging in. For subsequent user authentication during login, the registration process requires an authentication process. Considering the vast number and variety of portal servers and content servers providing media content, an enormous overhead is required for the implementation and maintenance of user authentication, registration, login, and access control mechanisms. A multitude of proprietary (non-standardized and inconsistent) solutions are used for authentication, registration, login and access control mechanisms. Furthermore, each portal and/or content server requires an associated data repository for storing user registrations as well as an interface for accessing and updating the data repository. In addition, the data repositories may need to include information about a user's access rights for media content. Access rights may specify a user's right to access specific classes or categories of media content and/or to access media content from a specific portal server, content server, or content provider.

In patent application US 2004/0184432 described is a method for controlling streaming services between a terminal and a streaming server via a communication network comprising at least one application server and a Call Session Control Function unit. According to US 2004/0184432, a streaming session is requested by the terminal sending a request message, containing information about the media content and the streaming server, e.g. the server address, via the Call Session Control Function unit to the application server. The application server communicates with the streaming server to request a description of the streaming service. Based on the description of the streaming service, the application server sets up a streaming session at the streaming server and informs the terminal accordingly. Subsequently, the terminal initiates the streaming service at the streaming server.

SUMMARY OF THE INVENTION

It is an object of this invention to provide a method and a system for providing to a user on a communication terminal media content from a content server, which system and method do not have the disadvantages of the prior art. In particular, it is an object of the present invention to provide a method and a system for providing to a user on a communication terminal media content from a content server without the need for implementing separate proprietary access control mechanisms for each content server.

According to the present invention, these objects are achieved particularly through the features of the independent claims. In addition, further advantageous embodiments follow from the dependent claims and the description.

According to the present invention, the above-mentioned objects are particularly achieved in that the communication terminal is configured to submit, in response to the user activating a hyperlink, associated with the media content, a first message generated as a Session Initiation Protocol (SIP) message addressed to a resource identifier identifying the media content. The hyperlink is selected by the user on a portal server, for example. For example, the first message is addressed using an instant messaging uniform resource identifier. The first message is received in a Call Session Control Function unit associated with the user. If there are filter criteria associated with the user that associate the first message with an application server, a second message, including the resource identifier, is transmitted from the Call Session Control Function unit to the application server, particularly a SIP application server. The application server is configured to transmit to the communication terminal accessing means for the user to retrieve the media content from the content server. In response to the accessing means being activated in the communication terminal, the media content is transmitted from the content server to the communication terminal. For example, the resource identifier included in the accessing means is a uniform resource identifier of the media content for the hypertext transfer protocol, the real-time streaming protocol, the real-time transfer protocol, or the file transfer protocol.

The Session Initiation Protocol as well as the Call Session Control Function unit were defined by the Third Generation Partnership Project (3GPP) in the context of the Internet Protocol (IP) Multimedia Subsystem (IMS). IMS was defined by 3GPP for providing IP multimedia services over mobile communication networks in 3GPP TS 23.228 V6.8.0, IP Multimedia Subsystem (IMS) Stage 2, $3^{rd}$ Generation Partnership Project. Multimedia services include a variety of services over both traditional circuit switched media (e.g. voice) and packet switched media (e.g. pictures, video, audio, instant messaging, presence, push-to-talk, chat rooms, etc.). IMS makes it possible for users to use multimedia real-time and non-real-time communication services as well as data oriented multimedia services. IMS supports multimedia services over IP-based networks between end-users as well as between end-users and servers. In addition to mobile radio networks, access over wireless local area networks (WLAN) has been included in the IMS specifications and even fixed IP-based networks can be integrated in IMS, making IMS a generic framework for multimedia services over IP. For setting up and controlling calls and sessions between user equipment and/or application servers, IMS includes so-called Serving Call Session Control Function (S-CSCF) units using the transaction-based Session Initiation Protocol (SIP) and Session Delivery Protocol (SDP) defined in 3GPP TS 24.229 V6.5.1, IP Multimedia Call Control Protocol based on Session Initiation Protocol (SIP) and Session Description Protocol (SDP), Stage 3, $3^{rd}$ Generation Partnership Project. A SIP transaction or dialogue is between two end-points called user agents. Typically, a SIP transaction or dialogue is a multimedia session performed between devices. There are different SIP methods for initiating a SIP transaction or dialogue (e.g. INVITE, SUBSCRIBE or MESSAGE).

Generating and submitting in the communication terminal a Session Initiation Protocol message, addressed to a resource identifier identifying the media content, make it possible to route a request for the media content through IMS, thereby making use of IMS's filtering features for user authentication and access control. Consequently, there is no need for separate proprietary access control mechanisms for the content server and/or a portal server. There is also no need for the portal server and/or the content server to be provided with a data repository, for storing user registrations and/or access rights, or an interface for accessing and updating such a data repository. Instead, defined features of IMS's Call Session Control Function unit are used to decide whether or not the user of the communication terminal submitting the first message is entitled to access media content related to the first message. IMS user profiles, containing the filter criteria typically used for routing purposes, are taken as the basis for deciding whether or not a user is entitled to access the specified media content. The user profile is retrieved by the Call Session Control Function unit from a home subscriber server (HSS) associated with the user. Specifically, if there are filter criteria, associated with the user, that associate the first message with an application server, the user is considered to be entitled to access the media content. Otherwise, if there are no filter criteria, associated with the user, that associate the first message with an application server, the user is considered not to be entitled to access the media content. Transmitting the second message to the application server makes it possible to dedicate a separate server to the handling of entitled requests for media content. Providing the communication terminal from the application server with accessing means for retrieving the media content makes it possible to adapt the content access flexibly to changing circumstances.

In an embodiment, the application server is configured to obtain from the second message the resource identifier and information about an access network being used by the communication terminal. Furthermore, the application server is configured to determine parameters for accessing the content server, based on the information about the access network, and to include the parameters in the accessing means. The information about the access network includes, for example, information about the type of telecommunications network, identification of the (visited) telecommunications network, and/or location information of the user. Parameters, specific to the access network used by the user, can be included automatically in the request for media content without any need for the content server to be provided with respective detection means.

In an embodiment, the application server is configured to obtain from the second message charging parameters indicating how to bill the user. Moreover, the application server is configured to generate billing information based on the charging parameters. Implementing a billing process in the application server has the advantage that, independent from the location and/or provider of the media content, the media content can be billed through one consistent mechanism. There is no need to provide the portal or content server with separate billing processes.

In an embodiment, the application server determines parameters for accessing the content server based on user customization information. Subsequently, the application server includes the parameters in the accessing means. The customization information includes, for example, an indication of the preferred quality or language. The customization information may be included in the second message, passed from the Call Session Control Function unit to the application server, or it may be stored in the application server or in a home subscriber server (HSS). Requests for media content can be customized without the user having to indicate his preferences with each request and without the user having to use memory in his communication terminal for storing user preferences.

In an embodiment, the application server determines user preferences based on user customization information. Subsequently, the application server generates a uniform resource identifier of the media content, based on the user preferences, and includes the uniform resource identifier in the accessing means. For example, different resource identifiers to different media content objects may be used depending on the preferred quality or language of the media content.

In addition to a method and system for providing to a user on a communication terminal media content from a content server, the present invention also relates to a computer program product including computer program code means for controlling a processor of a communication terminal, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
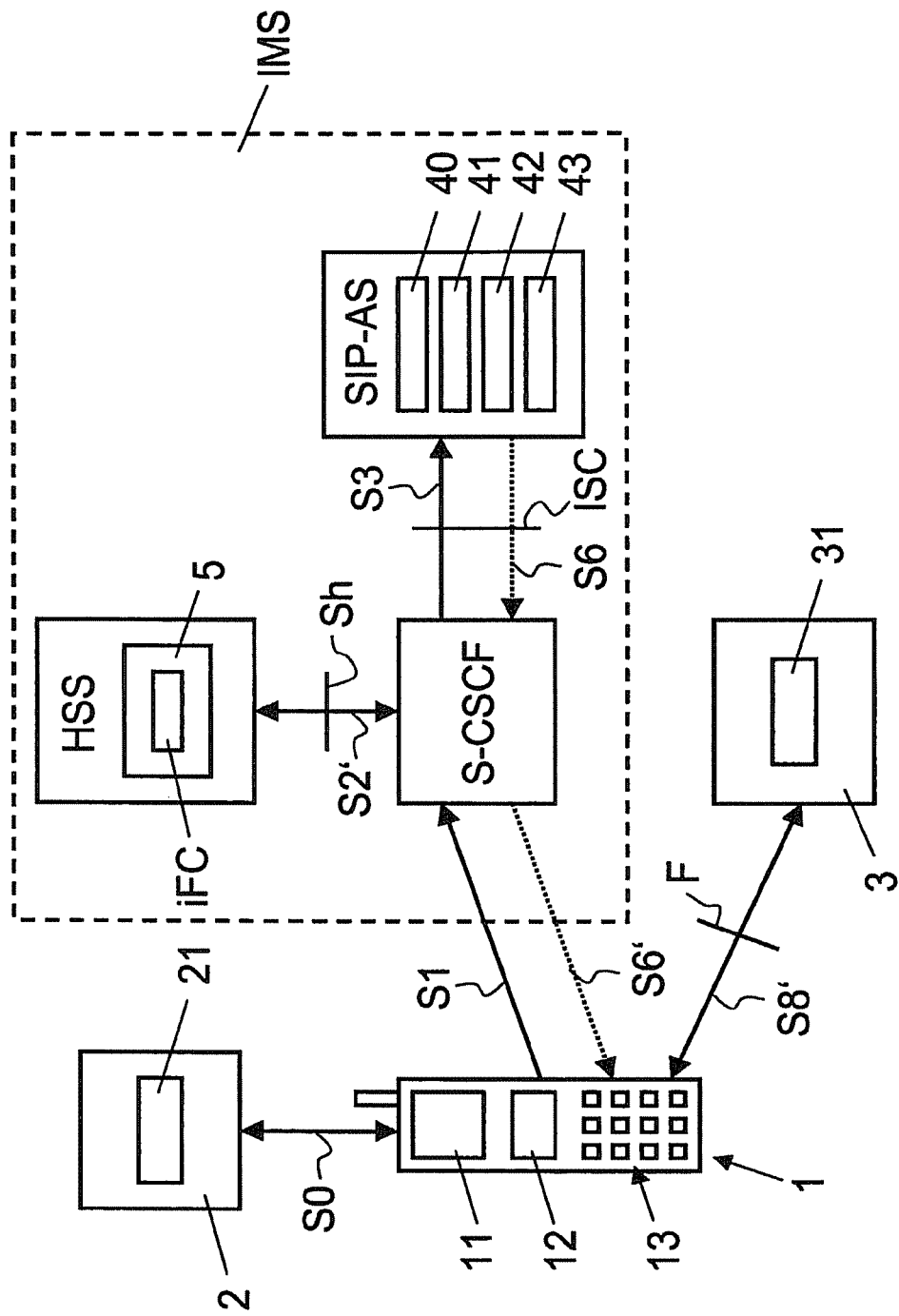
FIG. 1 shows a block diagram illustrating schematically an exemplary configuration of a system for providing to a user on a communication terminal media content retrieved from a content server, as well as a possible data flow between components of the system.
Figure 2:
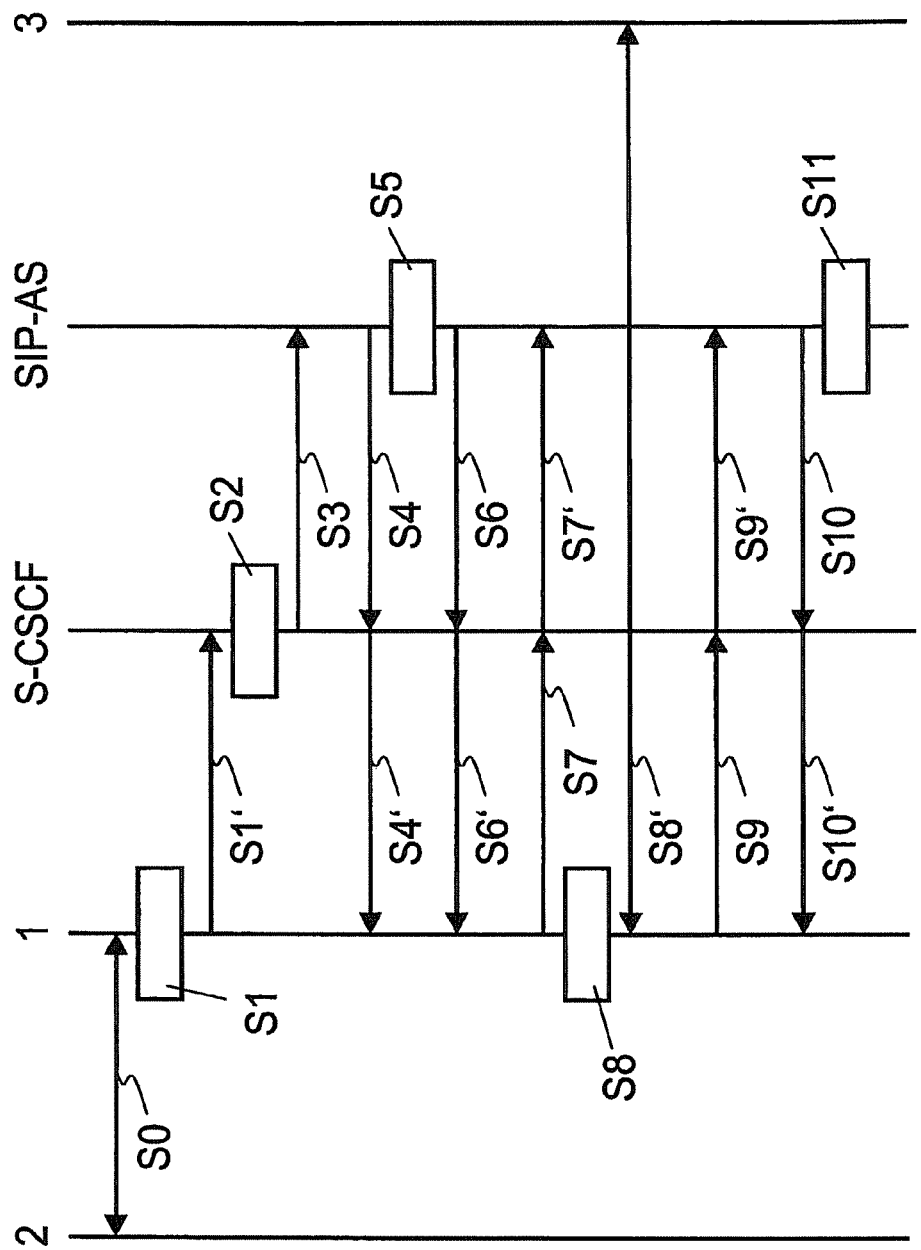
FIG. 2 shows a timing diagram illustrating schematically a possible data flow between components of the system for providing to a user media content on a communication terminal.

In FIGS. 1 and 2, identical reference numerals refer to corresponding components, steps or data flows, respectively.

In FIGS. 1 and 2, the reference numeral 2 refers to a portal server accessible in the World Wide Web through the Internet. The portal server 2 comprises one or more computers connected to the Internet. The portal server 2 is configured to be accessed by communication terminals by means of conventional browser applications for HTML (Hypertext Markup Language), XHTML (Extensible Hypertext Markup Language), WML (Wireless Markup Language), XML (Extensible Markup Language) or the like. The portal server 2 provides hyperlinks 21 to media content 31 stored on content server 3. The hyperlinks 21 include or are associated (e.g. via dynamic directory or naming servers) with a uniform resource locator (URL) to the media content 31. The content server 3 is connected to the Internet and includes one or more computers. The media content is stored as digital data files representing picture, video, audio and/or text content.

In FIGS. 1 and 2, reference numeral 1 refers to a communication terminal of a user. Communication terminal 1 is preferably a mobile communication terminal such as a mobile telephone supporting IP-based communication, e.g. a mobile telephone for a GSM-network (Global System for Mobile Communication) supporting GPRS (General Packet Radio Service) or for a UMTS-network (Universal Mobile Telecommunications System), a personal digital assistant (PDA), or another personal computer supporting mobile communication over a mobile telephone network or WLAN. As was mentioned earlier, alternatively, communication terminal 1 is a fixed communication terminal configured for IP-based communication over a fixed telecommunications network. The communication terminal 1 is configured to access the Internet through a mobile or fixed telecommunications network, respectively. The communication terminal 1 includes a conventional browser application for accessing the portal server 2. By means of the browser application the user can access and view web pages of the portal server 2 on the display 11 of the communication terminal 1. By means of operating elements 13, e.g. buttons, a keyboard, a touch pad, a scrolling wheel, a trackball, a joystick or the like, the user can select and activate hyperlinks 21 included in web pages of the portal server 2.

As is illustrated in FIG. 1, the communication terminal 1 also includes a functional module, request module 12, which is preferably implemented as a programmed software module. The computer program code of the request module 12 is stored on a computer readable medium, connected fixed or removable to the processor of communication terminal 1. One skilled in the art will understand, however, that the request module 12 can also be implemented fully or in part by means of hardware. The request module 12 is configured to control the processor of the communication terminal 1, such that the communication terminal 1 generates a Session Initiation Protocol message, in response to the user activating one of the hyperlinks 21. Particularly, the Session Initiation Protocol message is of the type "SIP MESSAGE" and addressed to a resource identifier identifying the media content 31 defined by the activated hyperlink 21. Particularly, an instant messaging uniform resource identifier is used to address the SIP message, for example "MESSAGE im:media-content@provider.net". The request module 12 is configured to submit the generated message to a telecommunications network enabling access to the IP Multimedia Subsystem IMS. As will be explained later in more detail, the request module 12 is also configured to receive and activate accessing means.

The IP Multimedia Subsystem IMS illustrated in FIG. 1 is adapted to carry out the proposed method for providing to a user on communication terminal 1 media content 31 provided by content server 3. In FIG. 1, only components of the IP Multimedia Subsystem referenced in the description of the proposed method are illustrated.

As is illustrated in FIG. 1, the IP Multimedia Subsystem IMS includes a Call Session Control Function unit S-CSCF serving (i.e. associated with) the user of communication terminal 1. The Call Session Control Function unit S-CSCF is based on the specifications for the IP Multimedia Subsystem defined by the Third Generation Partnership Project (3GPP).

Furthermore, the IP Multimedia Subsystem IMS includes a Home Subscription Server HSS associated with the user. The Home Subscription Server HSS is based on the specifications for the IP Multimedia Subsystem by 3GPP. The Home Subscription Server HSS contains the user profile 5 of the user, which includes filter criteria iFC associated with the user. The filter criteria iFC include so called Service Trigger Points defining conditions on Session Initiation Protocol (SIP) requests/messages. Moreover, the filter criteria iFC include address information of application servers to be contacted in cases when conditions on a SIP request are met. The user profile 5 also includes other user customization information such as user preferences, e.g. preferred language and/or preferred quality, and/or charging parameters indicating how to bill the user, e.g. off-line or on-line with correlation identity and charging node address.

The IP Multimedia Subsystem IMS illustrated in FIG. 1 also includes a SIP application server SIP-AS. As is illustrated schematically, the SIP application server SIP-AS includes several functional modules: an input module 40, a referral module 41, a customization module 42, and a charging module 43. The functional modules are preferably implemented as programmed software modules. The computer program code of the functional modules is stored on a computer readable medium, connected fixed or removable to the processor(s) of the application server SIP-AS. One skilled in the art will understand, however, that the functional modules can also be implemented fully or in part by means of hardware.

The input module 40 is configured to control the processor(s) of the application server SIP-AS, such that the application server SIP-AS receives messages from the Call Session Control Function unit S-CSCF and obtains from the received message the resource identifier and information about the access network being used by the communication terminal 1.

The customization module 42 is configured to control the processor(s) of the application server SIP-AS, such that the application server SIP-AS determines, based on user customization information, parameters and user preferences for accessing the content server 3. Depending on the embodiment, the customization module 42 obtains the user customization information from the message received from the Call Session Control Function unit S-CSCF or from the user profile stored in the Home Subscription Server HSS associated with the user.

The referral module 41 is configured to control the processor(s) of the application server SIP-AS, such that the application server SIP-AS transmits to the communication terminal 1 accessing means for the user to retrieve the media content 31 from the content server 3. The referral module 41 is configured to generate and include in the accessing means a uniform resource identifier (URI) of the media content 31. The uniform resource identifier of the media content 31 is generated by the referral module 41 for the hypertext transfer protocol (HTTP), the real-time streaming protocol (RTSP), the real-time transfer protocol (RTP), the file transfer protocol (FTP) or the like. The referral module 41 generates the uniform resource identifier based on the user preferences determined by the customization module 42, e.g. different resource identifiers for media content objects of different quality and/or language. Furthermore, the referral module 41 is configured to determine parameters for accessing the content server 3, based on the information about the access network determined by the network input module 40. The referral module 41 also includes the parameters for accessing the content server 3 in the accessing means.

The charging module 43 is configured to control the processor(s) of the application server SIP-AS, such that the application server SIP-AS determines charging parameters indicating how to bill the user. Depending on the embodiment, the charging module 43 obtains the charging parameters from the message received from the Call Session Control Function unit S-CSCF or from the Home Subscription Server HSS associated with the user. Moreover, charging module 43 is configured to generate billing information, for the media content retrieved by the user, based on the charging parameters.

In the Home Subscription Server HSS, the user profile 5 associated with the user includes filter criteria iFC with addressing information of the SIP application server SIP-AS. Moreover, the filter criteria iFC includes Service Trigger Points, which define conditions such that incoming SIP messages related to media content 31 on the content server 3 are forwarded to the SIP application server SIP-AS.

The Call Session Control Function unit S-CSCF serving the user and the Home Subscription Server HSS associated with the user are implemented on the same computer or on separate computers. Typically, the SIP application server SIP-AS is implemented on a separate computer.

In the following paragraphs, possible sequences of steps executing the proposed method are described with reference to FIGS. 1 and 2.

In step S0, the user uses his communication terminal 1 to access a web page of the portal server 2 and selects and activates one of the hyperlinks 21 provided by the portal server 2 and associated with media content 31 of content server 3.

In step S1, in response to the user activating the hyperlink, the request module 12 generates a SIP message addressed to an instant messaging uniform resource identifier identifying the media content 31 defined by the activated hyperlink 21. Implicitly, the instant messaging uniform resource identifier also identifies the content server 3 or provider, respectively, providing the media content 31.

In step S1', the SIP message generated in step S1 is submitted by the communications terminal 1 and routed by the telecommunications network to the Call Session Control Function unit S-CSCF serving the user.

In step S2, the Call Session Control Function unit S-CSCF downloads and/or queries the user profile 5, including the filter criteria iFC, from the Home Subscription Server HSS associated with the user. For example, the Call Session Control Function unit S-CSCF accesses the Home Subscription Server HSS through a Diameter-based reference point called Sh. Based on the user profile 5, the Call Session Control Function unit S-CSCF determines whether or not the filter criteria iFC associate the received SIP message with a SIP application server. If the SIP message is associated with a SIP application server, the SIP message is forwarded in step S3 via a so-called IP Multimedia Subsystem Service Control interface ISC to the respective SIP application server SIP-AS. Depending on the embodiment, the SIP message is forwarded together with additional information concerning the access network being used by the communication terminal 1 as well as user-specific customization information and charging parameters. Otherwise, if no SIP application server is associated with the SIP message, the SIP message is rejected as non-routable.

In step S4, the application server SIP-AS acknowledges the message forwarded in step S3 by sending a confirmation to the Call Session Control Function unit S-CSCF. The confirmation is transmitted via the IP Multimedia Subsystem Service Control interface ISC. Correspondingly, in step S4', the Call Session Control Function unit S-CSCF sends an acknowledgement to the communication terminal 1.

In step S5, the application server SIP-AS processes the message received from the Call Session Control Function unit S-CSCF and obtains from the received message the resource identifier identifying the media content 31. Depending on the embodiment, the application server SIP-AS obtains information concerning the access network being used by the communication terminal 1 as well as user-specific customization information and charging parameters from the received message or through querying the Call Session Control Function unit S-CSCF or the Home Subscription Server HSS, respectively. Moreover, the application server SIP-AS generates accessing means for the user to access the requested media content 31. The accessing means include a uniform resource identifier (URI) of the media content 31, generated based on the access network used by the communication terminal 1 and user preferences included in the customization information. Furthermore, the accessing means include parameters for accessing the content server 3, based on the information about the access network and user customization information.

In steps S6 and S6', the application server SIP-AS transmits the accessing means to the communications terminal 1 by transmitting a SIP message of type "REFER", including the accessing means, through the IP Multimedia Subsystem Service Control interface ISC and the Call Session Control Function unit S-CSCF to the communication terminal 1.

In steps S7 and S7', the communication terminal 1, specifically the request module 12, acknowledges the receipt of the REFER message by sending a confirmation through the Call Session Control Function unit S-CSCF and the IP Multimedia Subsystem Service Control interface ISC to the application server SIP-AS.

In step S8, the accessing means are activated in the communication terminal 1. Preferably, for activating the accessing means, the request module 12 is provided with an activating module, configured to automatically transmit an access request to the content server 3 using the uniform resource identifier (URI) and parameters included in the accessing means. In correspondence with the URI, the access request is a request in HTTP, RTSP, RTP, FTP or the like. In an alternative embodiment, displayed to the user on display 11 are the uniform resource identifier (URI) and parameters included in the accessing means, and the access request is generated by the user activating the URI using the operating elements 13. Accordingly, in step S8', the media content 31 is accessed by and transmitted to the communications terminal 1 through an HTTP, RTSP, RTP or FTP interface F.

In steps S9 and S9', the communication terminal 1, specifically the request module 12, confirms the successful transmission (receipt) of the media content 31 by responding to the REFER message with a SIP message of type "NOTIFY", transmitted through the Call Session Control Function unit S-CSCF and the IP Multimedia Subsystem Service Control interface ISC to the application server SIP-AS.

In steps S10 and S10', the application server SIP-AS acknowledges the receipt of the NOTIFY message by sending a confirmation through the IP Multimedia Subsystem Service Control interface ISC and the Call Session Control Function unit S-CSCF to the communication terminal 1.

In step S11, the application server SIP-AS generates billing information for the media content retrieved by the user, based on the charging parameters, the accessed media content, the customization level, the used access network, the user's location, and/or roaming conditions.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims.

The invention claimed is:

1. A method, comprising:
receiving a first message, from a communication terminal associated with a user, in a Call Session Control Function (CSCF) unit associated with the user, wherein said first message comprises a Session Initiation Protocol (SIP) message identifying a specific media content on a content server;
deciding, in the CSCF unit, whether the user is entitled to access, on the content server, the specific media content that is identified by the first message, said deciding comprising the CSCF unit determining whether there exists in a user profile of the user, filter criteria associated with the user that define that incoming messages related to the specific media content, on the content server, are to be forwarded to an application server that is separate from the content server; and
transmitting by the CSCF unit a second message to the application server, based on the existence of the filter criteria associated with the user, wherein the filter criteria enables associating of the first message with the application server and enables determining that the user is entitled to access the specific media content identified by a resource identifier on the content server; wherein:
said second message causes the application server to transmit to the communication terminal, accessing information for the user to retrieve the specific media content from the content server; and
said accessing information causes the communication terminal to retrieve the specific media content from the content server.

2. The method according to claim 1, wherein said second message comprises information about an access network being used by the communication terminal; and
said second message causes the application server to determine parameters for accessing the content server based on the information about the access network, said parameters being included in the accessing information.

3. The method according to claim 1, wherein said second message comprises charging parameters indicating how to bill the user, and
said second message causes the application server to generate billing information based on the charging parameters.

4. The method according to claim 1, wherein said second message causes the application server to determine parameters for accessing the content server based on user customization information, said parameters being included in the accessing information.

5. The method according to claim 1, wherein said second message causes the application server to determine user preferences based on user customization information; wherein:
the application server generates a uniform resource identifier of the specific media content based on the user preferences; and
the application server includes said uniform resource identifier in the accessing information.

6. The method according to claim 1, wherein the user selects the hyperlink on a portal server;
the first message is addressed using an instant messaging uniform resource identifier;
the first message is transmitted via a telecommunications network from the communication terminal to the CSCF unit;
the CSCF unit is part of an Internet Protocol Multimedia Subsystem;
the filter criteria is obtained from the user profile, which is retrieved by the CSCF unit from a home subscriber server associated with the user;
the application server is a SIP application server of the Internet Protocol Multimedia Subsystem;
the accessing information is transmitted via a telecommunications network from the application server to the communication terminal;
the accessing information includes a uniform resource identifier of the specific media content for one of hypertext transfer protocol, real-time streaming protocol, real-time transfer protocol, and file transfer protocol; and
the specific media content is transmitted via a telecommunications network from the content server to the communication terminal.

7. A system, comprising:
a Call Session Control Function (CSCF) unit associated with a user, the CSCF unit including a processor and being configured to receive a first message from a communication terminal associated with the user, wherein said first message comprises a Session Initiation Protocol (SIP) message identifying a specific media content on a content server;
the CSCF unit is operable to decide whether the user is entitled to access, on the content server, the specific media content that is identified by the first message, said deciding comprising the CSCF unit determining whether there exists in a user profile of the user, filter criteria associated with the user that define that incoming messages related to the specific media content, on the content server, are to be forwarded to an application server that is separate from the content server; and
the CSCF unit is operable to transmit a second message to the application server, based on the existence of the filter criteria associated with the user, wherein the filter criteria enables associating of the first message with the application server and enables determining that the user is entitled to access the specific media content identified by a resource identifier on the content server; wherein:
said second message causes the application server to transmit, to the communication terminal, accessing information for the user to retrieve the specific media content from the content server; and
the accessing information causes the communication terminal to retrieve the specific media content from the content server.

8. The system according to claim 7, wherein said second message comprises information about an access network being used by the communication terminal; and said second message causes the application server to determine parameters for accessing the content server based on the information about the access network, said parameters being included in the accessing information.

9. The system according to claim 7, wherein said second message comprises charging parameters indicating how to bill the user; and
said second message causes the application server to generate billing information based on the charging parameters.

10. The method according to claim 1, wherein said second message causes the application server to determine parameters for accessing the content server based on user customization information, said parameters being included in the accessing information.

11. The system according to claim 7, wherein said second message causes the application server to determine user preferences based on user customization information; wherein:
the application server generates a uniform resource identifier of the specific media content based on the user preferences; and
the application server includes said uniform resource identifier in the accessing information.

12. The system according to claim 7, wherein the user selects the hyperlink on a portal server;
the first message is addressed using an instant messaging uniform resource identifier;
the first message is transmitted via a telecommunications network from the communication terminal to the CSCF unit;
the CSCF unit is part of an Internet Protocol Multimedia Subsystem;
the filter criteria is obtained from the user profile, which is retrieved by the CSCF unit from a home subscriber server associated with the user;
the application server is a SIP application server of the Internet Protocol Multimedia Subsystem;
the accessing information is transmitted via a telecommunications network from the application server to the communication terminal;
the accessing information includes a uniform resource identifier of the specific media content for one of hypertext transfer protocol, real-time streaming protocol, real-time transfer protocol, and file transfer protocol; and
the specific media content is transmitted via a telecommunications network from the content server to the communication terminal.

13. A system, comprising:
a communication terminal that is operable to generate and submit, in response to the user activating a hyperlink associated with specific media content on a content server, a first message, wherein:
said first message comprises a Session Initiation Protocol (SIP) message identifying a specific media content on a content server; and
the first message is sent to a Call Session Control Function (CSCF) unit for deciding whether the user is entitled to access, on the content server, the specific media content that is identified by the first message, said deciding comprising the CSCF unit determining whether there exists in a user profile of the user, filter criteria associated with the user that define that incoming messages related to the specific media content, on the content server;

the communication terminal is operable to receive accessing information for enabling the user to retrieve the specific media content from the content server, wherein:
the accessing information including a uniform resource identifier of the specific media content; and
the accessing information is transmitted by an application server in response to receiving a second message transmitted to the application server from CSCF unit based on existence of filter criteria associated with the user, wherein the filter criteria enables associating of the first message with the application server; and
the communication terminal is operable to utilize the accessing information to retrieve the specific media content from the content server.

14. A system, comprising:
an application server that is operable to generate, in response a message received from a Call Session Control Function (CSCF) unit associated with a user, accessing information for use by the user in retrieving specific media content from a content server, wherein:
said message is generated by said CSCF unit based on a first message received in said CSCF unit from said user, said first message comprising a Session Initiation Protocol (SIP) message identifying the specific media content on said content server;
said message is transmitted from the CFCF unit to the application server based on existence of filter criteria associated with the user, wherein the filter criteria enables associating the first message with the application server; and
the accessing information comprising a uniform resource identifier of the specific media content; and
said application server is operable to transmit to a communication terminal associated with said user, said accessing information, wherein the communication terminal is operable to utilize the accessing information to retrieve the specific media content from the content server.

15. The system according to claim 14, wherein the application server, is operable to:
obtain from the message a resource identifier and information about an access network being used by the communication terminal;
determine parameters for accessing the content server based on the information about the access network; and
include said parameters in the accessing information.

16. The system according to claim 14, wherein the application server is operable to generate billing information based on charging parameters indicating how to bill the user, obtained from the message received from the CFCF unit.

17. The system according to claim 14, wherein the application server is operable to determine parameters for accessing the content server based on user customization information, and said parameters are included in the accessing information.

18. The system according to claim 14, wherein the application server is operable to:
determine user preferences for accessing the content server based on user customization information;
generate a uniform resource identifier of the specific media content based on the user preferences; and
include said uniform resource identifier in the accessing means.

* * * * *